United States Patent [19]
Starr et al.

[11] Patent Number: 5,535,264
[45] Date of Patent: Jul. 9, 1996

[54] PROMPT ISSUING PROTOCOL FOR AN INTERCEPT VOICE MESSAGING SYSTEM

[75] Inventors: Mark T. Starr, Fort Washington; Craig J. Mento, West Chester, both of Pa.; Carl R. Faix, Cherry Hill, N.J.; Robert A. Pressman, Narberth, Pa.; Albert B. Cooper, New York, N.Y.

[73] Assignee: Unisys Corporation, Blue Bell, Pa.

[21] Appl. No.: 561,227

[22] Filed: Nov. 2, 1995

Related U.S. Application Data

[63] Continuation of Ser. No. 283,489, Aug. 1, 1994, abandoned, which is a continuation of Ser. No. 16,588, Feb. 10, 1993, abandoned.

[51] Int. Cl.$^6$ ........................................... H04M 1/64
[52] U.S. Cl. .............................. 379/89; 379/88; 379/257; 379/377
[58] Field of Search .................................. 379/67, 70, 79, 379/88, 89, 112, 143, 144, 145, 146, 155, 214, 216, 211, 212, 213, 257, 377, 81, 84, 209

[56] References Cited

U.S. PATENT DOCUMENTS

| | | | |
|---|---|---|---|
| 4,510,349 | 4/1985 | Segre-Amer | 379/67 |
| 4,768,227 | 8/1988 | Dively et al. | 379/155 |
| 4,850,007 | 7/1989 | Marino et al. | 379/67 |
| 4,901,341 | 2/1990 | Carter et al. | 379/67 |
| 4,932,042 | 6/1990 | Baral et al. | 379/67 |
| 5,007,077 | 4/1991 | Fields et al. | 379/88 |
| 5,134,646 | 7/1992 | Carlson | 379/67 |
| 5,134,651 | 7/1992 | Ortiz et al. | 379/112 |
| 5,150,399 | 9/1992 | Yasuda | 379/67 |
| 5,239,573 | 8/1993 | Rangan | 379/88 |
| 5,321,740 | 6/1994 | Gregorek et al. | 379/67 |
| 5,333,186 | 7/1994 | Gupta | 379/201 |
| 5,381,465 | 1/1995 | Carter et al. | 379/67 |

*Primary Examiner*—Jeffery Hofsass
*Assistant Examiner*—Scott L. Weaver
*Attorney, Agent, or Firm*—Albert B. Cooper; Mark T. Starr

[57] ABSTRACT

A voice messaging service system for caller accepted voice store and forward service. The service offering prompt is issued during dial tone in response to caller off-hook, advising that the service can be accepted by the caller if the call to the intended recipient is not completed. Alternatively, the service offering prompt is delayed after caller off-hook for a time interval sufficient for the caller to dial the telephone number of the intended recipient. As a further embodiment, the service is offered for acceptance by the caller without advancing the call to the intended recipient.

2 Claims, 7 Drawing Sheets

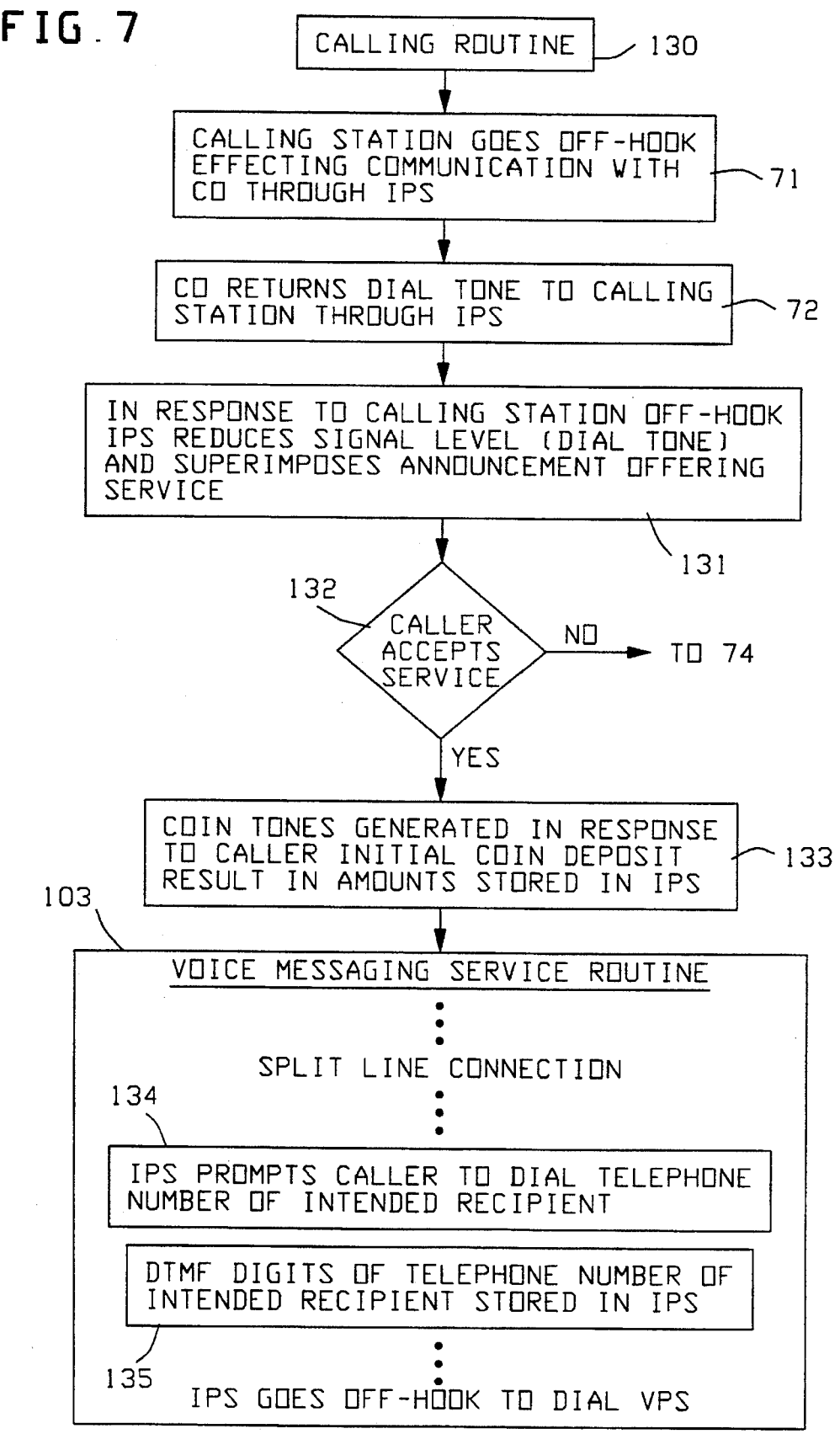

PROMPT ISSUING PROTOCOL FOR AN INTERCEPT VOICE MESSAGING SYSTEM

This is a continuation of application Ser. No. 08/283,489, filed Aug. 1, 1994 (now abandoned) which is a continuation of Ser. No. 08/016,588, filed on Feb. 10, 1993 (now abandoned).

BACKGROUND OF THE INVENTION

1. Field of the Invention

The invention relates to voice messaging offered for caller acceptance in a telecommunications network particularly with respect to service offering prompt issuance protocol.

2. Description of the Prior Art

Voice messaging systems are known where a prompt is issued to a caller on an incomplete call, offering a voice store and forward service for caller acceptance. Traditionally, the service offering prompt is issued when the system detects the busy or ring-no-answer condition at the intended call destination. Such systems are described, for example, in U.S. Pat. Nos. 5,134,646; 5,036,533; 4,932,042; 4,901,341; and 4,766,604.

The known prior art systems have the disadvantage of waiting for and detecting call progress tones, such as the busy tone or audible ringing tone, before offering the service. This limits service availability only to incomplete call situations. A caller may find it desirable to utilize the service facility without first attempting to contact the intended recipient. Additionally, impatient callers may disconnect upon hearing a busy signal or a number of unanswered rings prior to the service offering prompt being issued. Telephone company revenue is potentially lost since such callers might not disconnect if they were aware that the service was available for acceptance. Furthermore, the prior art systems require the inclusion of expensive call progress tone detectors for detecting the busy and ring-no-answer conditions.

SUMMARY OF THE INVENTION

The above-described disadvantages of the prior art are obviated by issuing the service offering prompt in response to stimuli other than detection of an incomplete call condition. Preferably, the prompt is issued in response to the caller going off-hook. Alternatively, the prompt may be issued after a predetermined time delay from the time the caller off-hook condition is detected. As a further alternative, the prompt can be issued in response to the caller completing entry of the destination telephone number. A further embodiment involves issuing the prompt so as to permit caller acceptance of the service before the call is advanced to the destination.

BRIEF DESCRIPTION OF THE DRAWINGS

FIG. 7 is a flow chart diagram illustrating an alternative calling routine utilized in accordance with the present invention.

DESCRIPTION OF THE PREFERRED EMBODIMENTS

The embodiments of the invention disclosed herein are explained as modifications of the system described in U.S. Pat. No. 5,134,646; issued Jul. 28, 1992; "Voice Messaging Method And Apparatus For Pay Phone Telephone Systems" by Shaun E. Carlson. Said U.S. Pat. No. 5,134,646 is assigned to the assignee of the present invention and is incorporated herein by reference in its entirety.

Figure 1:
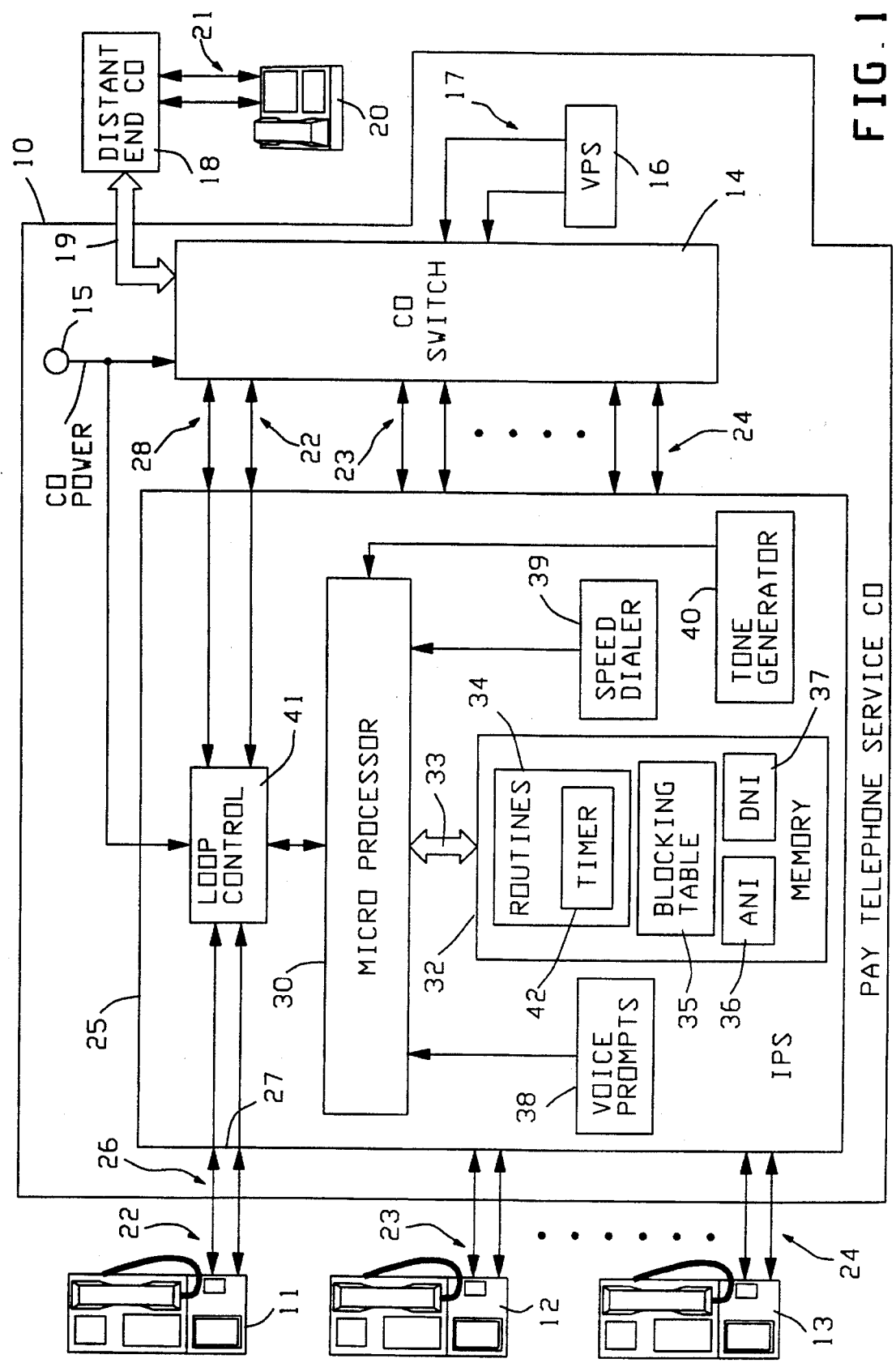
FIG. 1 is a schematic block diagram of a multiple station telephone system configured to embody the present invention.

Referring to FIG. 1, a schematic diagram of a telephone system including a pay telephone network is illustrated. A pay telephone serving Central Office (CO) 10 services a plurality of pay telephones 11–13. The CO 10 may be the Central Office of a telephone system regional operating company, such as a Regional Bell Operating Company (RBOC). The CO 10 includes a conventional CO switch 14 for receiving, routing, rating and otherwise processing telephone calls. The switch 14 receives conventional CO power as schematically represented at 15. The pay telephones 11–13 may, for example, be conventional Bell System instruments such as coin operated telephones and credit card responsive telephones, often referred to as "dumb" phones. The present invention may also be utilized with so-called "smart" phones as well as non-pay phones such as subscriber residential and business telephones. A Voice Processing Subsystem (VPS) 16 is located at the CO 10 for providing voice store and forward functions in accordance with the system in which the present invention is embodied. The VPS 16 is a commercially procurable system, as described in said U.S. Pat. No. 5,134,646, and is coupled to the CO switch 14 via a conventional loop or trunk connection 17.

The CO switch 14 from the CO 10 communicates with one or more distant end COs or trunk exchanges, such as a distant end CO 18. The trunk connections between the switch 14 and the CO 18 are schematically represented at 19. A representative called telephone 20 is coupled to the CO 18 via a conventional line connection or loop 21.

Each of the pay telephones 11–13 is coupled to the CO 10 and the CC switch 14 via a conventional line connection or loop 22, 23 and 24, respectively. As described in said U.S. Pat. No. 5,134,646, an Intercept Processing Subsystem (IPS) 25 is interposed in each of the loops 22–24 between the telephones 11–13 and the CO switch 14. The operation and interaction of the IPS 25 with respect to the loop 22 is identical to the operation and interaction thereof with respect to the loops 23 and 24. The invention will be described with respect to the loop 22. In this regard, the loop 22 is comprised of a telephone side loop portion 26 extending from the telephone 11 to a loop input port 27 of the IPS 25 and a CO side loop portion 28 extending from the IPS 25 to the CO switch 14. The functionality of the IPS 25 is performed and controlled by a microprocessor 30 included therein. The microprocessor 30 is coupled to a memory 32 via a bus 33. The memory 32 includes routines 34 to be executed by the microprocessor 30 in a manner to be described. The routines 34 include a timer 42 to be later described in the performance of an embodiment of the present invention. The memory 32 also includes a blocking table 35 containing telephone numbers loaded by the user that are to be excluded from the voice messaging service.

The memory 32 further includes a conventional Automatic Number Identification (ANI) function 36, as well as a conventional Dialed Number Identification (DNI) function 37. As is well understood, the ANI 36 effectively functions to capture the telephone number of the calling station. Data relative to the calling number is transmitted to the VPS 16. This function is performed by the microprocessor 30 storing the identification (ID) of the input port of the IPS 25 to which the calling telephone is connected. For example, if the serviced call is from the telephone station 11, the microprocessor 30 stores the ID of the input port 27 in the ANI 36. If the caller accepts the voice messaging service, the microprocessor 30 transmits the port ID from the ANI 36 to the VPS 16. The VPS 16 contains user supplied look-up tables that correlate the port IDs of the IPS units with the telephone numbers of the serviced stations. Similarly, the DNI 37 functions, in a well known manner, to capture the called telephone number entered at a calling station. For example, if a call is placed from the telephone station 11, the microprocessor 30 captures the called telephone number and stores it in the DNI 37. Traditionally, the called number is in the form of DTMF (Dual Tone Multi-Frequency) digits. If service is accepted, the called DTMF digits are transmitted from the DNI 37 via the microprocessor 30 to the VPS 16.

The IPS 25 includes a voice prompt function 38 accessible by the microprocessor 30 for generating and delivering predetermined voice prompts and announcements to a calling telephone station, in a manner to be described. If a caller goes off-hook at the telephone station 11, the microprocessor 30 utilizes the voice prompt function 38 to deliver a voice announcement to the caller, in accordance with the invention, at the station 11 via the loop 26. Thus, the microprocessor 30 and voice prompt function 38 comprise a prompt issuance means to provide a voice prompt to the caller. As discussed below, the voice prompt is issued to the caller in response to a prompt issuance signal provided in response to detecting that the caller has gone off-hook at the telephone 11. The voice prompt function 38 may be implemented in any convenient manner by utilizing, for example, announcer or voice chip coders and the like.

The IPS 25 further includes a speed dialer 39 that is utilized by the microprocessor 30 for speed dialing the VPS 16 via the loop portion 28 and the CO switch 14. The speed dialer 39 dials one or more telephone numbers of the VPS 16 utilizing DTMF digits. The IPS 25 also includes a tone generator 40 utilized by the microprocessor 30 for sending dial tone to the calling telephone in accordance with an embodiment of the invention and for sending conventional coin tones to the CO switch 14, as described in said U.S. Pat. No. 5,134,646.

Devices are well known and available in the art for implementing the voice prompts 38, the speed dialer 39 and the tone generator 40. Such devices may be implemented to provide digital outputs and thus are directly connectable as inputs to the microprocessor 30, as illustrated.

The IPS 25 includes loop control circuit 41 responsive to the telephone side loop portion 26 and the CO side loop portion 28 of the loop 22 and to the CO power 15 for performing various functions with respect to the loop 22 in accordance with FIGS. 3–7.

Figure 2:
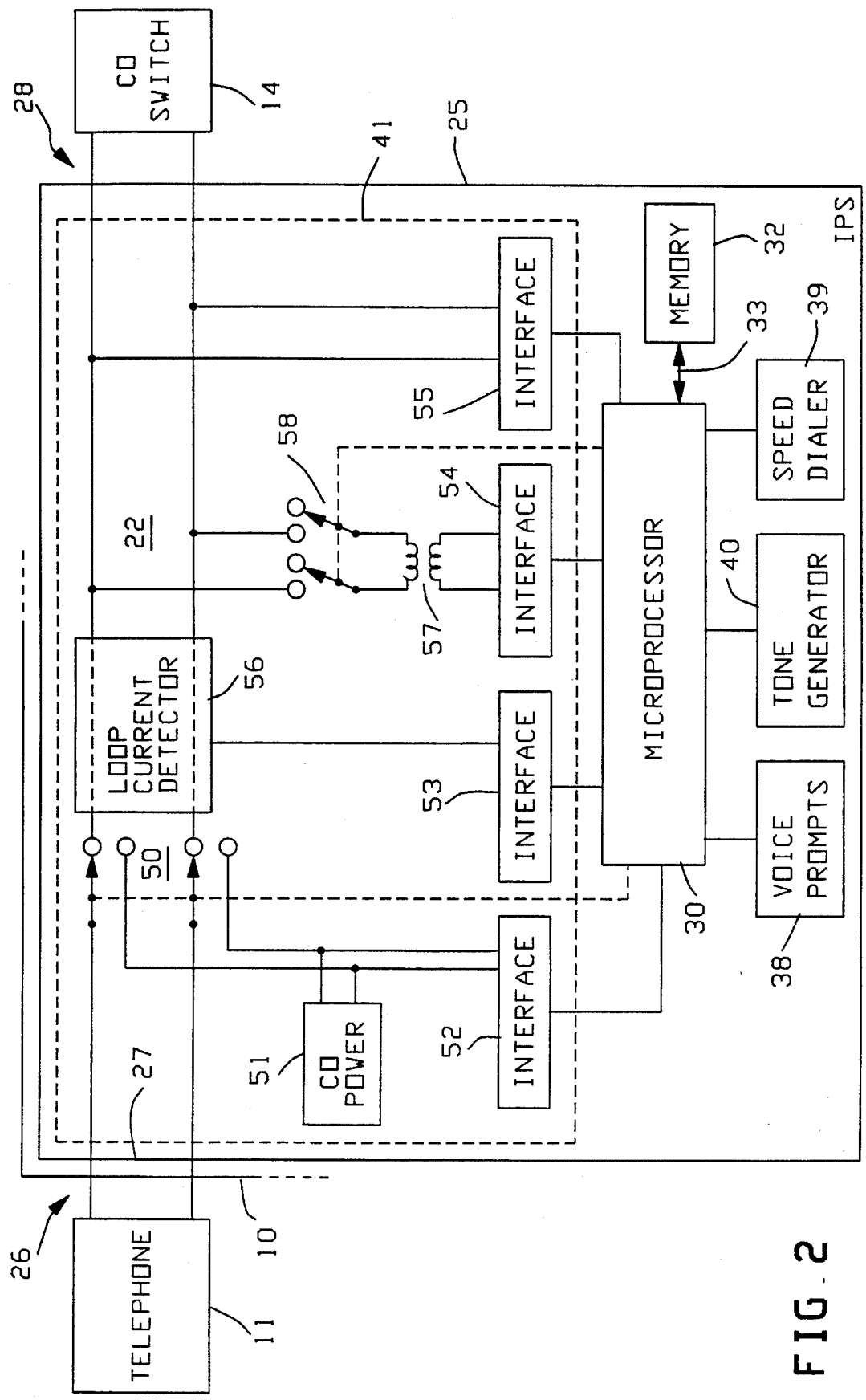
FIG. 2 is a schematic block diagram illustrating details of the loop control circuit of FIG. 1.

Referring to FIG. 2, in which like reference numerals indicate like components with respect to FIG. 1, further details of the loop control circuit 41 are illustrated. The microprocessor 30 controls a relay 50 to maintain a straight through line connection between the loop portions 26 and 28 or to split the line connection 22 and connect the telephone 11 to a source of CO battery power 51. The microprocessor 30 monitors and communicates with the loop 22 through appropriate interfaces 52, 53, 54 and 55 which conventionally include A/D and D/A converters depending on the direction of the communication.

The microprocessor 30 utilizes the interface 52 for communicating with the caller at the telephone station 11 when the line connection 22 is split by the relay 50 and utilizes the interface 53 to monitor the line connection 22 for such call progress signals as off-hook and on-hook using a conventional loop current detector 56. Thus, the loop current detector 56 is a detection means for detecting when the caller has gone off-hook and provides a prompt issuance signal to the microprocessor 30 through the interface 53 in response thereto. The detected off-hook signal (prompt issuance signal) is used as a detected network condition for initiating the service offering prompt issuance in accordance with the invention. As discussed above, the microprocessor 30 and voice prompts 38 (prompt issuance means) issues the prompt to the caller in response to this prompt issuance signal.

The interface 54 communicates with the loop 22 through an isolation transformer 57 and a relay 58. The microprocessor 30 utilizes the interface 54 for seizing the loop portion 28 to the CO switch 14 by controlling the relay 58 when the line connection is split by the relay 50, speed dialing the VPS 16 using the speed dialer 39 and, thereafter, transmitting call parameters thereto. The relay 58 is utilized by the microprocessor 30 to effect on-hook/off-hook control of the loop 22 going to the CO switch 14.

The microprocessor 30 utilizes the interface 55 to monitor the line connection 22 for a service acceptance signal from the caller, as well as for such call progress signals as dial tone, which may be utilized as a detected network condition for initiating prompt issuance. That is, as discussed below, when the caller goes off-hook, the CO switch 14 returns dial tone to the telephone 11 through the IPS 25. This dial tone may be detected through the interface 55 by the microprocessor 30, thereby providing yet another type of prompt issuance signal in response to caller off-hook. This may be used as an alternative to the prompt issuance signal discussed above with respect to the loop current detector 56.

As described above, the microprocessor 30 and voice prompts 38 comprise a prompt issuance means. The interface 55 also includes conventional components for coupling the prompt to the caller. Thus, the interface 55 may include a conventional isolation transformer capacitively coupled to the loop 22, as well as conventional operational amplifier circuitry for reducing the signal level on the loop 22 while superimposing the service offering prompt. For example, the operational amplifier circuitry may be operated in combination with the isolation transformer within the interface 55 for controllably loading the line connection 22 so as to reduce the volume of tones on the line. Thereafter, the microprocessor 30 can superimpose a voice announcement from the voice prompts 38 through the interface 55 on the reduced volume tone. The interface 5 may also be utilized to speed dial the VPS 16, as well as to transmit call parameters thereto, after the line to the CO switch 14 is seized by operation of the relay 58.

When the line connection 22 is split by the relay 50, the interface 52 is utilized to monitor and communicate with the loop portion 26, while the interfaces 53, 54 and 55 are utilized to monitor and communicate with the loop portion 28. The microprocessor 30 uses the speed dialer 39 to speed dial the VPS 16 via the interface 54 or 55 and uses either the interface 54 or 55 for passing parameters of the call to the VPS 16.

The present invention is applicable to sent paid telephone calls where the caller deposits coinage at the calling station as well as to non-sent paid telephone calls where the caller utilizes a credit or calling card. With respect to sent paid calls, the voice messaging service is paid for by the initial deposit of the caller and any additional deposit required by the IPS 25 or the CO switch 14, in a manner to be described. For non-sent paid calls, the VPS 16 includes conventional credit and calling card rating and billing apparatus for billing the caller for the service. It is anticipated that in the present embodiment of the invention, each RBOC will include a voice processing subsystem such as the VPS 16 for providing the voice messaging service. It is appreciated that pay telephone calls placed within the area serviced by an RBOC require the same initial deposit. The invention is, however, also readily applicable to service that extends across RBOC boundaries. In other words, the invention applies to both local and long distance telephone service.

FIGS. 3–7 provide flow charts for the routines 34 utilized in performance of the invention. In the descriptions to follow of FIGS. 3–7, it is assumed that a caller places a telephone call at the pay station 11 to the telephone 20. The flow charts of FIGS. 3–7 are structured with respect to sent paid calls. The operations and functions appropriate to non-sent paid calls will be explained at the appropriate points in the description.

Figure 3:
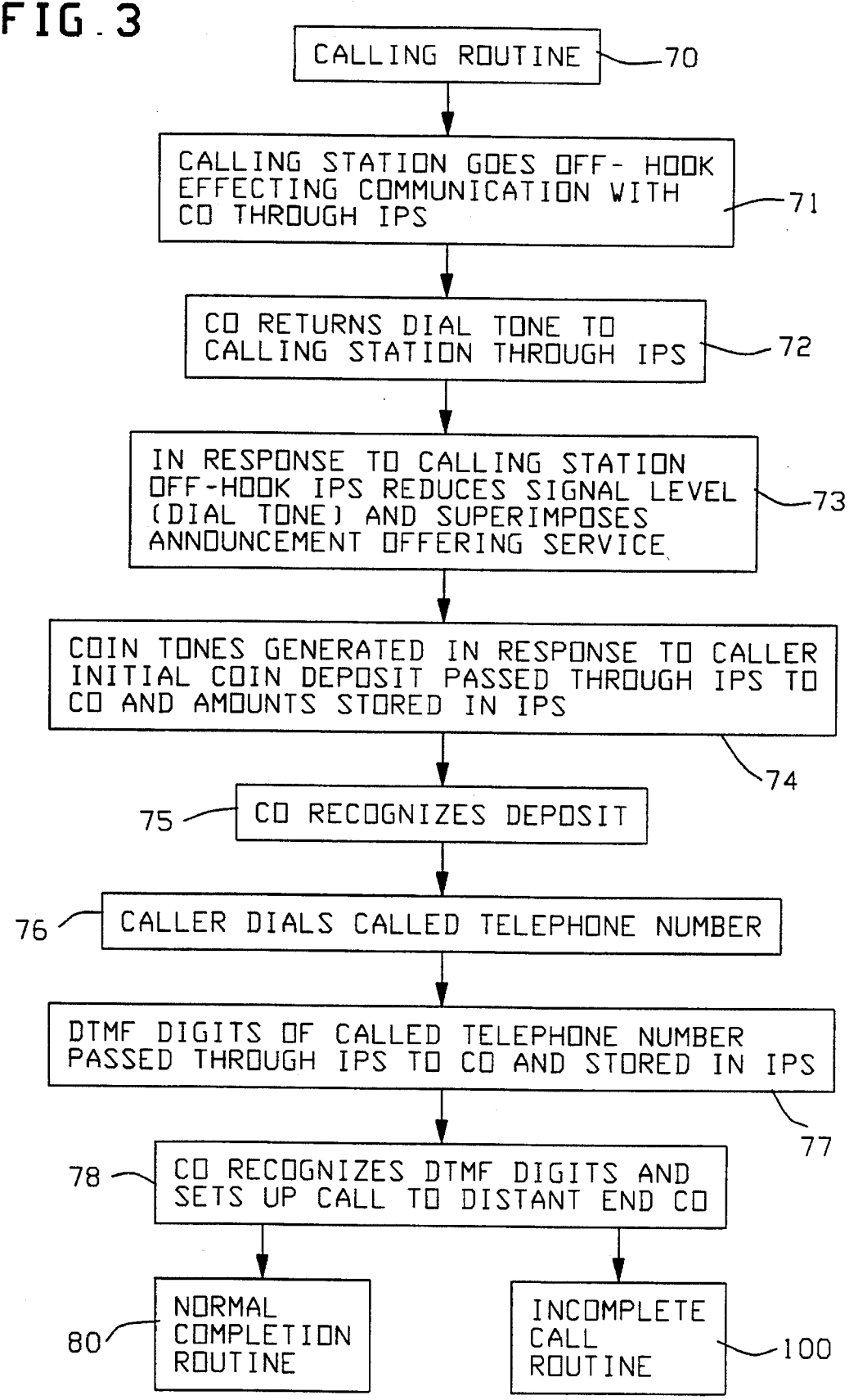
FIG. 3 is a flow chart diagram illustrating part of the calling routine of the system of FIG. 1.

Referring to FIG. 3, with continued reference to FIGS. 1 and 2, a calling routine 70 is illustrated. During the quiescent on-hook condition of the telephone station 11, the microprocessor 30 controls the loop control circuit 41 to maintain the straight through connection between the loop portions 26 and 28. Pursuant to a block 71, when the calling station 11 goes off-hook, communication is effected with the CO switch 14 through the IPS 25 via the loop 22 with the microprocessor 30 monitoring the loop 22. Pursuant to a block 72, the CO switch 14 returns dial tone to the calling station 11 which passes through the IPS 25. As described above, caller off-hook is detected and the prompt issuance signal is provided either with respect to the interface 53 (loop current) or the interface 55 (dial tone).

Pursuant to a block 73 in accordance with the invention, the IPS 25, in response to the calling station going off-hook, reduces the signal level of the dial tone on the loop 22 and superimposes a service offering announcement to the caller. The microprocessor 30 utilizes the appropriate preprogrammed announcement from the voice prompts function 38. The announcement may be as follows: "IF THE NUMBER YOU INTEND TO CALL IS BUSY OR DOES NOT ANSWER, YOU MAY RECORD A MESSAGE FOR LATER DELIVERY TO THAT NUMBER BY PRESSING THE STAR KEY". The caller is alerted prior to placing the call that a voice messaging service is available and can be accepted should the caller encounter an incomplete call disposition. Thus, impatient callers who might otherwise disconnect immediately upon hearing a busy signal or a number of unanswered rings are on notice that the opportunity to leave a message is available for acceptance. Revenue that otherwise would be lost, may be collected utilizing the invention.

Although the star key is suggested as the acceptance signal, alternatively the pound key may be utilized. As a further option, star or pound may be utilized followed by one or two digits and other acceptance signals will he apparent to those skilled in the art. The acceptance signal should be such that it is never encountered in normal telephone number dialing. As an additional option, a DTMF protocol may be included to permit a caller who is familiar with the service to terminate the delivery of the prompt.

As indicated by a block 74, for sent paid calls, the coin tones generated in response to the initial coin deposit of the caller are monitored by and passed through the IPS 25 to the CO switch 14 and, pursuant to a block 75, the CO switch 14 recognizes the deposit. The microprocessor 30 monitors the coin tones and stores the amount of the deposit in memory 32. For non-sent paid calls, conventional apparatus associated with the CO switch 14 validates and processes credit and calling card numbers in a well known manner. The microprocessor 30 also stores the card number in memory 32 for later transmission to the VPS 16 if voice messaging service is accepted.

At a block 76, the caller at the telephone station 11 dials the called telephone number. Pursuant to a block 77, the DTMF digits of the called telephone number pass through the IPS 25 to the CO switch 14. The microprocessor 30 monitors the loop 22 storing the dialed digits in memory 32. At a block 78, the CO switch 14 recognizes the DTMF digits of the called telephone number and sets up the call to the distant end CO 18. If the disposition of the call is call completion, a normal completion routine 80 is followed. If, however, the disposition of the call is incomplete, an incomplete call routine 100 is followed.

Figure 4:
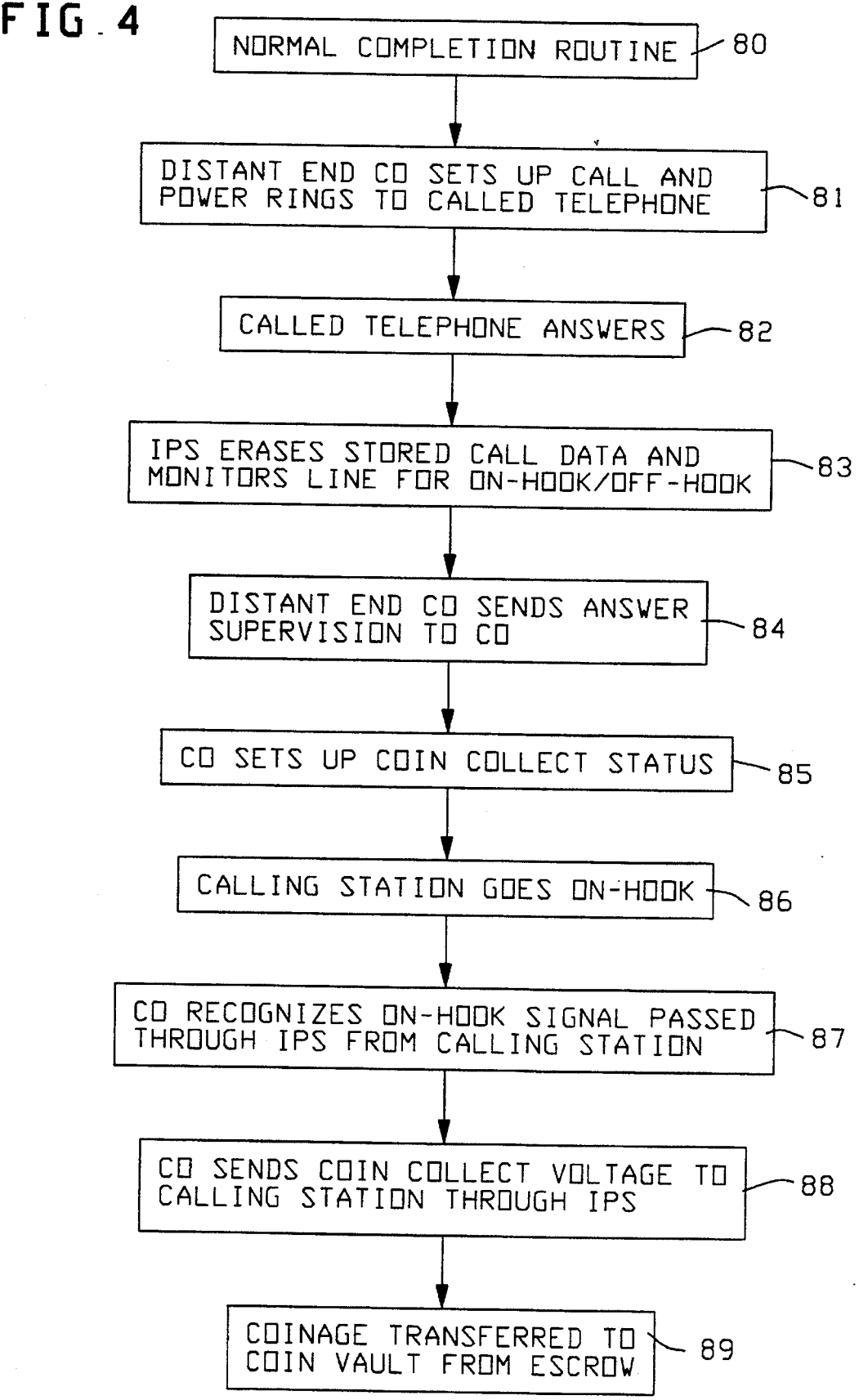
FIG. 4 is a flow chart diagram illustrating the normal completion procedure of the calling routine of FIG. 3 for a telephone call placed from a station of the system of FIG. 1.

Referring to FIG. 4, with continued reference to FIG. 1 and 2, the normal completion routine 80 is illustrated. Pursuant to a block 81, the distant end CO 18 sets up the call and power rings the called telephone 20 and, pursuant to a block 82, the called telephone 20 answers. In response to this call completion condition, the microprocessor 30 erases the stored call data from the memory 32 pursuant to a block 83 and continues to monitor the loop 22 for the on-hook condition which will occur at the telephone station 11 when the call is terminated. Thus, when the caller at the station 11 receives an answer condition from the called party at the telephone 20, the IPS 25 will not activate message service with respect to the station 11 until a subsequent call is placed therefrom as detected by an on-hook/off-hook sequence.

When the called telephone 20 answers the call, the distant end CO 18 sends an answer supervision signal to the CO switch 14 in response to which the CO switch 14 sets up the coin collect status. Blocks 84 and 85 depict these operations. Pursuant to a block 86, the calling station 11 goes on-hook at the termination of the call. A block 87 depicts the recognition by the CO switch 14 of the on-hook signal which is passed through the IPS 25 from the calling station 11. In response to the on-hook signal, the CO switch 14 sends the coin collect voltage to the calling station 11 through the IPS 25 as depicted by a block 88. In response to the coin collect voltage, the telephone station 11 collects the deposited coinage by transferring the coins from the telephone station escrow chamber to the coin vault. Block 89 designates this operation.

Figure 5:
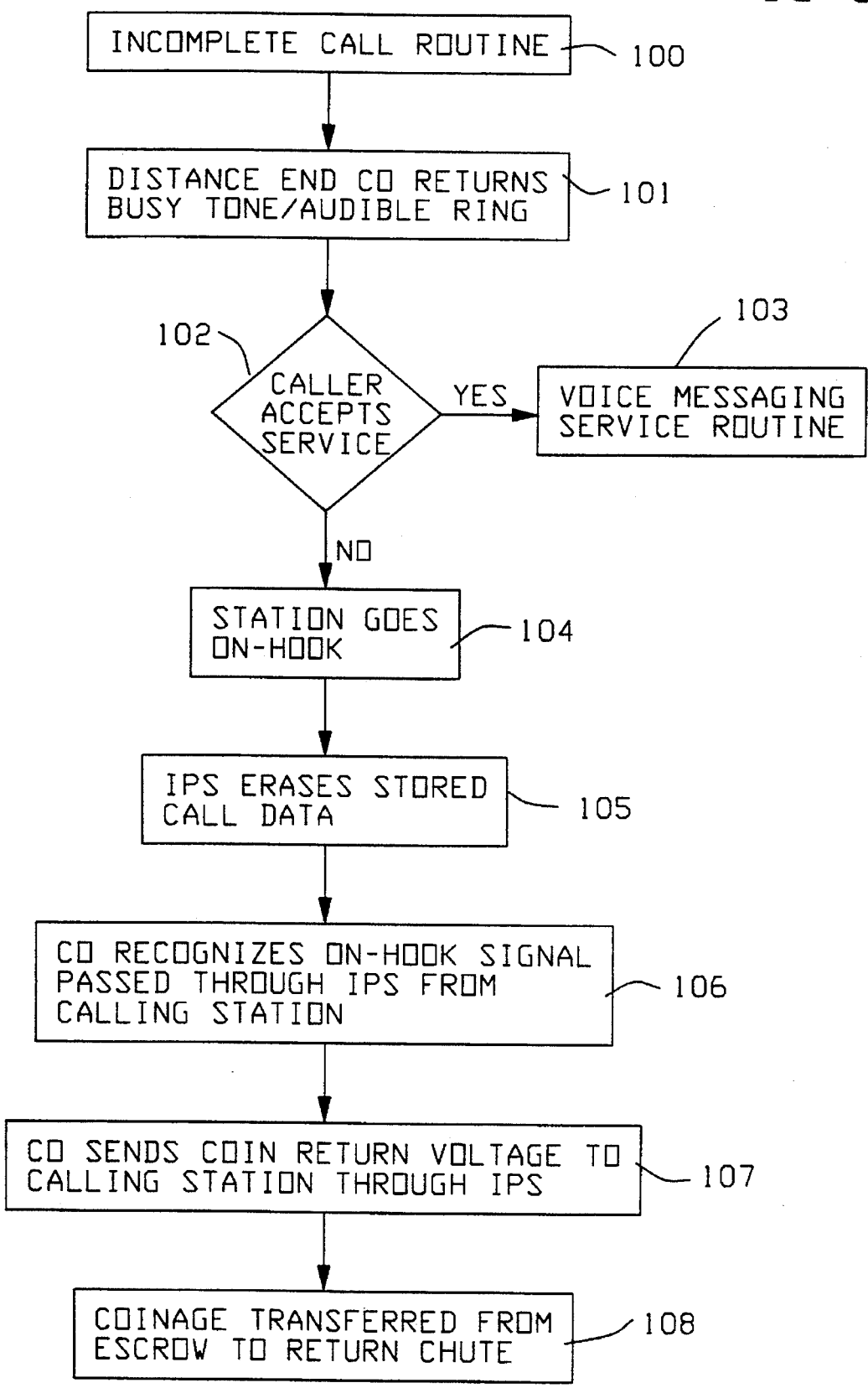
FIG. 5 is a flow chart diagram illustrating the incomplete call procedure for the calling routine of FIG. 3 when the call is not completed.

Referring to FIG. 5, with continued reference to FIGS. 1 and 2, details of the incomplete call routine 100 of FIG. 3 are illustrated. In accordance with a block 101, the distant end CO 18 returns a busy tone or an audible ring which is passed through the CO switch 14 and the IPS 25 to the calling station 11. The microprocessor 30 controls the loop control circuit 41 to maintain a straight through connection for the loop 22. The microprocessor 30 continues to monitor the loop 22 so that should the called party answer prior to the caller accepting voice messaging service, the microprocessor 30 would control the IPS 25 to return to idle.

If the caller accepts service pursuant to a block 102 (YES path), the IPS 25 immediately initiates message service pursuant to a voice messaging service routine 103. The caller accepts the service pursuant to the announcement discussed above with respect to the block 73 of FIG. 3 in response to hearing the busy tone/audible ring of block 101. The voice messaging service may be invoked by the acceptance signals discussed above.

The caller rejects the voice messaging service, as depicted by the NO path from the block 102, by not performing the predetermined service acceptance action and placing the telephone 11 on-hook pursuant to a block 104. The IPS 25 continues to monitor the loop 22 for a subsequent off-hook condition and does not further effect message services until a subsequent call is placed from the pay station 11 as indicated by the on-hook/off-hook sequence.

In response to the station 11 going on-hook, the microprocessor 30, pursuant to a block 105, erases the data stored in the memory 32 pursuant to the attempted telephone call. In accordance with a block 106, the CO switch 14 recognizes the on-hook signal passed through the IPS 25 from the calling station 11. Since the telephone call was not completed nor voice messaging service accepted, the CO switch 14 is set to transmit the coin return voltage to the line 22. Pursuant to blocks 107 and 108, the CO switch 14 sends the coin return voltage to the calling station 11 through the IPS 25 and in response thereto the coinage in the escrow chamber or hopper of the calling station 11 is transferred to the return chute thereof. If the caller accepts the voice messaging service pursuant to the YES path at the block 102, the IPS 25 enters the voice messaging service routine 103.

The voice messaging service routine 103 is substantially the same as described in detail in said U.S. Pat. No. 5,134,646. Briefly, in the voice messaging service routine 103, the IPS 25 recognizes caller acceptance, splits the line connection 22 going on-hook to the CO 14, maintains loop current to the station 11 and then goes off-hook to speed dial the VPS 16 utilizing the speed dialer 39. When the VPS 16 answers, the IPS 25 transmits the parameters of the call thereto. As described in said U.S. Pat. No. 5,134,646, such parameters include the called telephone number stored in the IPS 25. Simultaneously, with transmitting the call parameters to the VPS 16, the IPS 25 plays a "Please Stand By" prompt to the caller. When the call parameter process is validated, the IPS 25 effects the straight through line connection and the VPS 16 prompts the caller to record a message. The caller records the voice message which is passed through the IPS 25 and the CO switch 14 to the VPS 16. Thereafter, the VPS 16 endeavors to deliver the voice message to the called station.

Figure 6A:
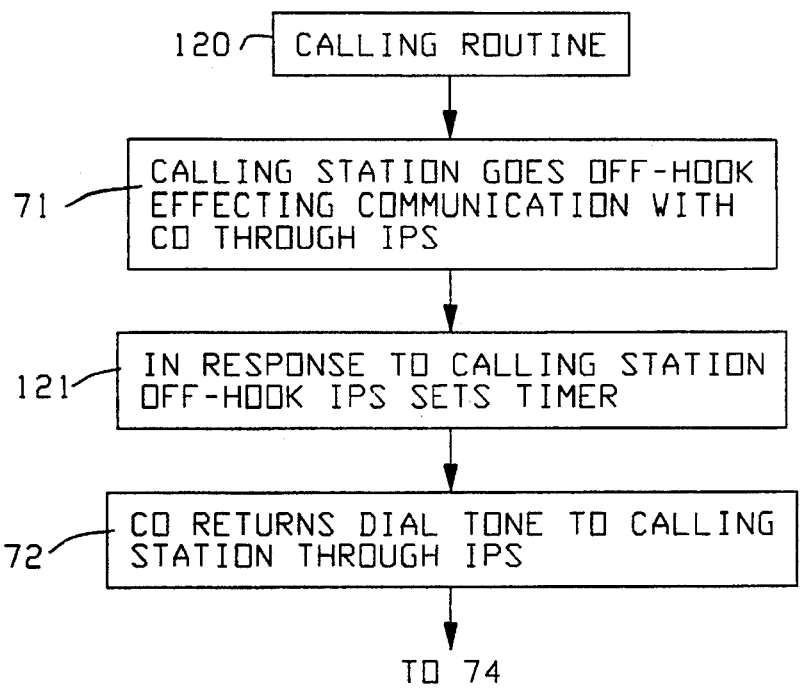
FIGS. 6a and 6b are flow chart diagrams illustrating modifications to FIGS. 3 and 5, in accordance with an alternative embodiment of the invention.
Figure 6B:
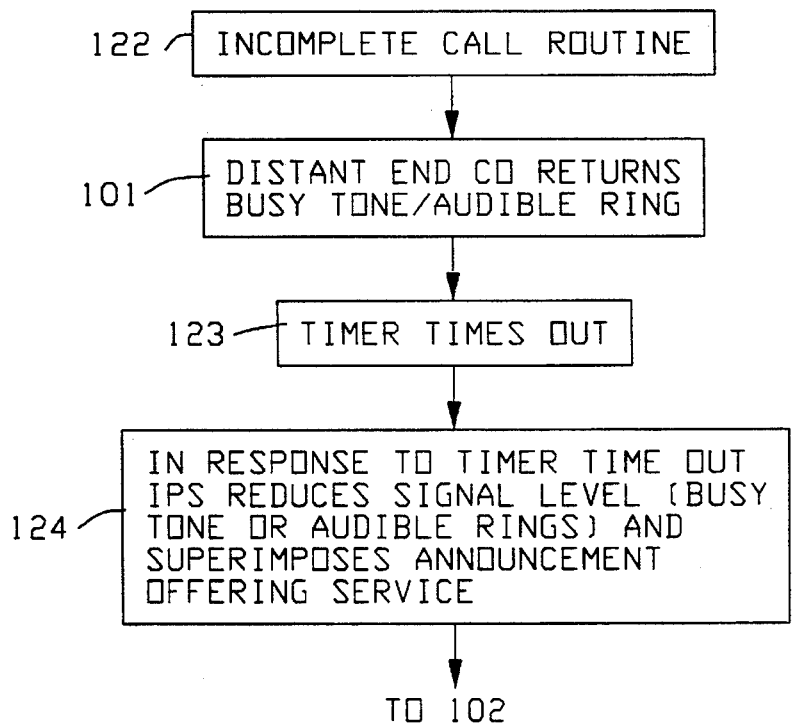

Referring to FIGS. 6a and 6b, with continued reference to FIGS. 1 and 2, an alternative calling routine 120 with a corresponding alternative incomplete call routine 122 are illustrated, respectively. It is appreciated that FIG. 6a is a modification of FIG. 3 and that FIG. 6b is a modification of FIG. 5. FIGS. 6a and 6b utilize the same reference numerals as FIGS. 3 and 5 to depict the same functionality. In the calling routine 120, after the calling station goes off-hook, as illustrated in block 71, the IPS 25, in accordance with a block 121, sets the timer 42 in response to the calling station off-hook. The timer 42 is set with a time duration sufficient for the caller to dial the telephone number of the intended recipient and for the call to be set up to the called telephone station 20. The calling routine 120 continues as before with the block 72 depicting the return of dial tone from the CO to the calling station. Thereafter, the calling routine 120 continues with the block 74 of FIG. 3.

The incomplete call routine 122 of FIG. 6b depicts, at a block 123, the timer 42 timing out. In accordance with a block 124, the IPS 25, in response to the timer 42 timing out, reduces the busy tone or audible ring signal on the line and superimposes a service offering announcement. In the incomplete call routine 122, the announcement may be as follows: "IF THE NUMBER YOU ARE CALLING IS BUSY OR NOT ANSWERING, YOU MAY RECORD A MESSAGE FOR LATER DELIVERY TO THAT NUMBER BY PRESSING THE STAR KEY". It is appreciated that alternative acceptance signalling may be utilized as discussed above with respect to block 73 of FIG. 3. The microprocessor 30 continues to monitor the loop 22 for called party answer prior to timer 42 timing out and after the service availability announcement has begun, but before the caller activates acceptance of the voice messaging service. If the called party answers, the microprocessor 30 terminates delivery of the prompt and controls the loop control circuit 41 to resume normal volume level on the loop 22 and does not further effect voice messaging service until a subsequent call is placed from the pay station 11 as detected by an on-hook/off-hook sequence. If the called party does not answer, the incomplete call routine 122 continues with the block 102 of FIG. 5. It is appreciated that the caller can enter the acceptance signal during delivery of the prompt to accept the service.

A further embodiment of the invention may be effected by eliminating the timer 42 of FIG. 1 and the block 121 of FIG. 6a. In FIG. 6b, the block 123 is replaced by the IPS 25 determining that the caller has completed the dialing sequence. The service offering announcement of block 124 is issued in response to the caller completing the dialing sequence. It is appreciated, with respect to these embodiments, that the service will not be offered or provided for telephone numbers stored in the blocking table 35.

Referring to FIG. 7, a calling routine 130 is depicted that provides the caller with two options. As before, the caller can accept voice messaging service if the call disposition is busy or ring-no-answer. Additionally, the caller can accept the voice messaging service without the call being placed to the telephone station of the intended recipient. The caller is provided with two opportunities to accept the service; before the call is advanced to the destination, and after the call is advanced to the destination if call disposition is incomplete.

In the calling routine 130 of FIG. 7, the same reference numerals are utilized to denote the same functionality with respect to FIG. 3. Thus, in accordance with the blocks 71 and 72, the calling station 11 goes off-hook and the CO 10 returns dial tone to the calling station 11 through the IPS 25. In a manner similar to the block 73 of FIG. 3, a block 131 denotes that in response to the calling station going off-hook, the IPS reduces the dial tone signal level and superimposes a service offering announcement. In accordance with the block 131 of the calling routine 130, the announcement may be as follows: "YOU ARE PROVIDED WITH TWO OPTIONS—OPTION ONE—IF THE NUMBER YOU INTEND TO CALL IS BUSY OR DOES NOT ANSWER, BY PRESSING THE STAR KEY AT THAT TIME YOU MAY RECORD A MESSAGE FOR LATER DELIVERY TO THAT NUMBER—OPTION TWO—YOU MAY INSTEAD, WITHOUT PUTTING THE CALL THROUGH, RECORD THE MESSAGE FOR LATER DELIVERY TO THE NUMBER BY PRESSING THE STAR KEY NOW." As described above, alternative acceptance signals may be utilized.

A decision block 132 tests to determine if the caller is accepting voice messaging service at this time. If not, the NO path is taken and processing continues with the block 74 of FIG. 3. It is appreciated that this processing path may lead to the incomplete call routine 100, as described above with respect to FIG. 5, providing the caller with a second opportunity to accept voice messaging service if the call is not completed.

If, however, the caller accepts service pursuant to the block 132, the YES path is taken which immediately initiates voice messaging service pursuant to the voice messaging service routine 103. It is appreciated that the coin tones generated in response to the caller's initial coin deposit are stored in the IPS 25 pursuant to a block 133.

As discussed above, the voice messaging service routine 103 is described in detail in said U.S. Pat. No. 5,134,646. As further discussed above, the routine 103 includes the IPS 25 splitting the line connection 22 after recognizing the acceptance signal. Subsequent to splitting the line, the IPS 25 goes off-hook to dial the telephone number of the VPS 16. When processing is performed pursuant to FIG. 7, the voice messaging service routine 103 is modified to include two additional steps interposed after the line is split and before the IPS 25 goes off-hook to dial the VPS 16. In accordance with a block 134, the IPS 25 prompts the caller to dial the telephone number of the intended recipient and pursuant to a block 135 the DTMF digits of the telephone number of the intended recipient are stored in the memory 32 of the IPS 25. Thereafter, as described above and in said U.S. Pat. No. 5,134,646, the IPS 25 goes off-hook to speed dial the VPS 16 and when the VPS 16 answers the IPS 25 transmits the call parameters to the VPS 16 including the stored telephone number of the intended recipient. Then, as described, the line connection 22 is re-established and the protocol continues with the caller recording the message which the VPS 16 later endeavors to deliver to the intended recipient.

The embodiment of FIG. 7 is described in terms of offering the service for acceptance prior to dialing the telephone number of the intended recipient. It is appreciated that, alternatively, the system embodiment of FIG. 7 can be operated so that service is offered for acceptance after entering the telephone number but before the call is advanced. In that embodiment, the line connection 22 would be split, when the caller goes off-hook the IPS 25 would provide dial tone to the caller using the tone generator 40, and the caller would enter the telephone number of the intended recipient which would be stored in the memory 32. The IPS 25 would then issue the prompt discussed above with respect to the block 131. If at that time service is not accepted, the IPS 25 would re-establish the line connection and speed dial the call to the intended recipient thereby providing the caller with the opportunity to accept service if the call is incomplete. The incomplete call routine 100 of FIG. 5 would be utilized for this purpose. If, however, the caller accepts service without the call being placed, processing proceeds with block 133 of FIG. 7 except that the voice messaging service routine 103 would not prompt for the telephone number of the intended recipient, as described with respect to blocks 134 and 135. As discussed, this parameter is already stored in the memory 32 of the IPS 25 and, as described above and in said U.S. Pat. No. 5,134,646, is transmitted to the VPS 16 with the call parameters. In other words, it is appreciated from the above that in this alternative embodiment of FIG. 7, the Voice Messaging Service Routine 103 is used as described in said U.S. Pat. No. 5,134,646 and not as modified as shown in FIG. 7 with respect to blocks 134 and 135.

Furthermore, as discussed above, it will be appreciated that with the line connection 22 split by the relay 50 (FIG. 2), the interface 52 is used by the microprocessor 30 to monitor and communicate with the loop portion 26 to the calling telephone station 11. The interface 52 includes A/D and D/A converters depending on the direction of the communication. Additionally, as described above, the service will not be offered or provided for telephone numbers stored in the blocking table 35.

In the FIG. 7 embodiment, if the caller accepts service pursuant to the block 132, an additional option may be implemented in the voice messaging service routine 103. After the caller records the message and before the calling station 11 goes on-hook, the VPS 16 may remind the caller that his call has not gone through and that no attempt was made to put the call through, but that attempts will be made to deliver the message in accordance with the message delivery protocol of the voice messaging service routine 103.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In a voice messaging system for use in a telecommunications network of a telephone company, said system providing a voice store and forward service to a caller at a telephone of said network whereby said caller can record a voice message that the system will deliver to an intended recipient at a telephone number of said intended recipient, said network including a central office and a line connection coupling said telephone to said central office, said system including an Intercept Processing Subsystem (IPS) interposed in said line connection, said IPS being operative to control said line connection by controllably maintaining a straight through condition between said telephone and said central office or by splitting said line connection, said IPS including prompt issuance means for issuing voice prompts to said caller over said line connection, said IPS including a speed dialer for dialing telephone numbers to said central office over said line connection, said IPS including detection means for detecting when said caller has gone off-hook, said system further including a Voice Processing Subsystem (VPS) for recording said voice message and delivering said voice message to said intended recipient, a voice messaging service method offering and providing said caller with two opportunities to accept said voice store and forward service, a first opportunity occurring when said caller goes off-hook at said telephone before said caller dials said telephone number of said intended recipient to place a call thereto and a second opportunity occurring after said caller dials said telephone number of said intended recipient and said call is advanced through said central office, said voice messaging service method operating to offer and provide said voice store and forward service to said caller without said system detecting if said call by said caller to said intended recipient results in a busy or no-answer condition, said method comprising:

A) maintaining, by said IPS, said line connection in said straight through condition, B) detecting, by said detection means, when said caller has gone off-hook at said telephone, C) issuing a voice prompt to said caller by said prompt issuance means in response to said caller going off-hook so as to provide said voice prompt to said caller prior to said caller dialing said telephone number of said intended recipient, said voice prompt being issued as follows:
YOU ARE PROVIDED WITH TWO OPTIONS—FIRST OPTION—IF THE NUMBER YOU INTEND TO CALL IS BUSY OR DOES NOT ANSWER, BY PRESSING THE STAR KEY AT THAT TIME YOU MAY RECORD A MESSAGE FOR LATER DELIVERY TO THAT NUMBER—SECOND OPTION—YOU MAY INSTEAD, WITHOUT PUTTING THE CALL THROUGH, RECORD THE MESSAGE FOR LATER DELIVERY TO THE NUMBER BY PRESSING THE STAR KEY NOW, D) said voice prompt being arranged to advise said caller of availability of said voice store and forward service, E) said voice prompt being further arranged to advise said caller that, as a first of two options, said voice store and forward service can be accepted by said caller upon pressing said star key if said caller detects that said call placed by said caller to said telephone number of said intended recipient results in said busy or no-answer condition, F) said voice prompt being further arranged to advise said caller that, as a second of said two options, said voice store and forward service can be accepted by said caller by pressing said star key without putting said call through to said telephone number of said intended recipient, G) said voice prompt alerting said caller to said availability of said voice store and forward service prior to said caller dialing said telephone number of said intended recipient so that said caller can accept said voice store and forward service upon pressing said star key before dialing said telephone number of said intended recipient as well as after dialing said telephone number of said intended recipient when said caller detects said busy or no-answer condition, H) said voice prompt defining a call contract exclusively between said telephone company and said caller where said telephone company offers said caller said voice store and forward service, said caller accepting said voice store and forward service by pressing said star key either before said caller dials said telephone number of said intended recipient or after said caller dials said telephone number of said intended recipient and detects that said call to said telephone number of said intended recipient has resulted in said busy or no-answer condition, I) if said caller accepts said voice store and forward service pursuant to said second option,
I1) splitting, by said IPS, said line connection,
I2) prompting said caller by said IPS, using said prompt issuance means, to dial said telephone number of said intended recipient,
I3) storing, in said IPS, said telephone number of said intended recipient dialed by said caller pursuant to step I2,
I4) speed dialing said VPS by said IPS using said speed dialer,
I5) transmitting call parameters to said VPS from said IPS including said telephone number of said intended recipient stored in said IPS,
I6) re-establishing, by said IPS, said line connection to said straight through condition whereby said caller at said telephone can record said voice message in said VPS for delivery to said intended recipient, J) if said caller does not accept said voice store and forward service pursuant to said second option,
J1) dialing, by said caller, said telephone number of said intended recipient to extend said call through said central office,
J2) storing said telephone number of said intended recipient in said IPS dialed pursuant to step J1, K) if said caller detects said busy or no-answer condition and accepts said voice store and forward service pursuant to said first option,
K1) splitting, by said IPS, said line connection,
K2) speed dialing said VPS by said IPS using said speed dialer,
K3) transmitting call parameters to said VPS from said IPS including said telephone number of said intended recipient stored in said IPS,
K4) re-establishing, by said IPS, said line connection to said straight through condition whereby said caller at said telephone can record said voice message in said VPS for delivery to said intended recipient.

2. In a voice messaging system for use in a telecommunications network of a telephone company, said system providing a voice store and forward service to a caller at a telephone of said network whereby said caller can record a voice message that the system will deliver to an intended recipient at a telephone number of said intended recipient, said network including a central office and a line connection coupling said telephone to said central office, said system including an Intercept Processing Subsystem (IPS) interposed in said line connection, said IPS being operative to control said line connection by controllably maintaining a straight through condition between said telephone and said central office or by splitting said line connection, said IPS including prompt issuance means for issuing voice prompts to said caller over said line connection, said IPS including a speed dialer for dialing telephone numbers to said central office over said line connection, said IPS including a dial tone generator, said IPS including detection means for detecting when said caller has gone off-hook, said system further including a Voice Processing Subsystem (VPS) for recording said voice message and delivering said voice message to said intended recipient, a voice messaging service method offering and providing said caller with two opportunities to accept said voice store and forward service, a first opportunity occurring before a call dialed by said caller to said telephone number of said intended recipient is advanced to said central office and a second opportunity occurring after said caller dials said telephone number of said intended recipient and said call is advanced through said central office, said voice messaging service method operating to offer and provide said voice store and forward service to said caller without said system detecting if said call by said caller to said intended recipient results in a busy or no-answer condition, said method comprising:

A) splitting said line connection by said IPS,
B) when said caller has gone off-hook at said telephone, providing dial tone to said caller at said telephone using said dial tone generator in said IPS,
C) dialing, by said caller, said telephone number of said intended recipient, D) storing, in said IPS, said telephone number of said intended recipient dialed by said caller pursuant to step C, E) issuing a voice prompt to said caller by said prompt issuance means after step D, so as to provide said voice prompt to said caller subsequent to said caller dialing said telephone number of said intended recipient and before said call is advanced to said central office, said voice prompt being issued as follows:

YOU ARE PROVIDED WITH TWO OPTIONS—FIRST OPTION—IF THE NUMBER YOU INTEND TO CALL IS BUSY OR DOES NOT ANSWER, BY PRESSING THE STAR KEY AT THAT TIME YOU MAY RECORD A MESSAGE FOR LATER DELIVERY TO THAT NUMBER—SECOND OPTION—YOU MAY INSTEAD, WITHOUT PUTTING THE CALL THROUGH, RECORD THE MESSAGE FOR LATER DELIVERY TO THE NUMBER BY PRESSING THE STAR KEY NOW,

F) said voice prompt being arranged to advise said caller of availability of said voice store and forward service, G) said voice prompt being further arranged to advise said caller that as a first of two options, said voice store and forward service can be accepted by said caller upon pressing said star key if said caller detects that said call placed by said caller to said telephone number of said intended recipient results in said busy or no-answer condition, H) said voice prompt being further arranged to advise said caller that, as a second of said two options, said voice store and forward service can be accepted by said caller by pressing said star key without putting said call through to said telephone number of said intended recipient, I) said voice prompt alerting said caller to said availability of said voice store and forward service subsequent to said caller dialing said telephone number of said intended recipient but before said call is advanced to said central office so that said caller can accept said voice store and forward service upon pressing said star key after dialing said telephone number of said intended recipient but before said call is advanced to said central office as well as after dialing said telephone number of said intended recipient and after said call is advanced through said central office and when said caller detects said busy or no-answer condition, J) said voice prompt defining a call contract exclusively between said telephone company and said caller where said telephone company offers said caller said voice store and forward service, said caller accepting said voice store and forward service by pressing said star key either after said caller dials said telephone number of said intended recipient and before said call is advanced to said central office or after said caller dials said telephone number of said intended recipient and detects that said call to said telephone number of said intended recipient has resulted in said busy or no-answer condition, K) if said caller accepts said voice store and forward service pursuant to said second option,
 K1) with said line connection split by said IPS, speed dialing said VPS by said IPS using said speed dialer,
 K2) transmitting call parameters to said VPS from said IPS including said telephone number of said intended recipient stored in said IPS,
 K3) establishing, by said IPS, said line connection to said straight through condition whereby said caller at said telephone can record said voice message in said VPS for delivery to said intended recipient, L) if said caller does not accept said voice store and forward service pursuant to said second option,
 L1) establishing said line connection to said straight through condition by said IPS,
 L2) speed dialing said telephone number of said intended recipient by said IPS using said speed dialer, M) if said caller detects said busy or no-answer condition and accepts said voice store and forward service pursuant to said first option,
 M1) splitting, by said IPS, said line connection,
 M2) speed dialing said VPS by said IPS using said speed dialer,
 M3) transmitting call parameters to said VPS from said IPS including said telephone number of said intended recipient stored in said IPS,
 M4) re-establishing, by said IPS, said line connection to said straight through condition whereby said caller at said telephone can record said voice message in said VPS for delivery to said intended recipient.

* * * * *